UNITED STATES PATENT OFFICE 2,537,890

NEUTRALIZATION OF HIGH-MOLECULAR WEIGHT ORGANIC ESTERS

William M. Gearhart and Lester W. A. Meyer, Kingsport, Tenn., assignors to Eastman Kodak Company, Rochester, N. Y., a corporation of New Jersey No Drawing. Application November 24, 1948, Serial No. 61,924

4 Claims. (Cl. 260—499)

This invention relates to the purification of organic esters, and more particularly to the neutralization of organic esters of high molecular weight.

A considerable number of organic esters of high molecular weight have been found to be valuable plasticizers for cellulose esters, vinyl resins, and the like. The commercial use of these plasticizers is dependent on several important physical properties. These include high boiling point, good heat stability, low toxicity, low water solubility, and freedom from color, odor, and acidity. The esters should be vacuum distilled and thoroughly neutral.

High boiling point is dependent, though not directly, on high molecular weight. Most esters of high molecular weight are highly water insoluble. While this is a desirable property, it operates to make complete neutralization difficult in the case of many compounds. High-boiling acidic substances remain dissolved in the highly insoluble crude ester where they cannot be effectively reached by conventional treatment with a neutralizing agent, and are carried over into the final product during vacuum distillation.

We have discovered that organic esters having a molecular weight of at least 330 which are resistant to hydrolysis can be very thoroughly freed from acidity, and their heat stability improved, by treating them at 100° C., or a slightly higher temperature, for one hour with 5% sodium hydroxide solution. We shall call this the "caustic boil" method of neutralization. The resistance of an ester to hydrolysis can be readily checked by determining its hydrolysis rate by conventional methods. By "resistant to hydrolysis" we mean sufficiently resistant to hydrolysis so that excessive losses are not brought about by treatment with hot 5% caustic solution.

Esters with which we have found our novel "caustic boil" method of neutralization to be effective include glyceryl tri-2-ethyl-butyrate, glyceryl, tri-2-ethyl hexoate, di-2-ethyl-hexyl diglycollate, and di-iso-octyl phthalate. The compound di-2-ethyl-hexyl diglycollate is claimed in copending application Serial No. 25,795 of Edward M. McMahon.

The value of our caustic boil process of neutralization may be well illustrated by the difficulties encountered in obtaining an odor-free, colorless, heat stable, acid-free grade of glyceryl tri-2-ethyl butyrate. This compound is an effective plasticizer for cellulose organic acid esters, and is, therefore, of commercial value. Commercial 2-ethyl-butyric acid contains 10–14% of caproic acid; plasticizers made from 2-ethyl-butyric acid must be substantially acid-free in order to avoid development of odor due to traces of caproic acid. It is preferred to have the ester contain less than 0.01% acid (calculated as free 2-ethyl-butyric acid). This acid content may also be expressed as an acid number of 0.05 in mg. of KOH per gram of ester. In making the ester, the esterification is most conveniently run until the crude ester has an acid number of 1.5–2 (0.4% acid). In conventional practice, the ester at this stage is usually thoroughly mixed with an aqueous dispersion of a neutralizing agent, washed with additional water washes, and distilled in vacuo. In our own tests, we tried sodium carbonate, sodium hydroxide, calcium oxide, magnesium carbonate, calcium carbonate, and magnesium oxide as neutralizing agents. The results are summarized in the following table, which shows the acid numbers of the various cuts of the distillation following neutralization. In the table, "R. T." stands for "Room Temperature." Unless otherwise indicated, the temperature of treatment was 80–100° C. In all cases the duration of treatment was one hour. The neutralizing compounds were added in 10–15 times the theoretical amount needed to neutralize the free acid in the crude ester. Higher amounts of neutralizing compound did not further lower the acid number.

| Neutralizing Compound | $Na_2CO_3$ | 5% NaOH R. T. | CaO | $MgCO_3$ | $CaCO_3$ | MgO | $NH_4OH$ R. T. | $Na_2CO_3$ R. T. | 5% NaOH at 100° C. |
|---|---|---|---|---|---|---|---|---|---|
| Fraction: | | | | | | | | | |
| #1 | 1.88 | 2.6 | 1.77 | 2.96 | 5.6 | 1.6 | 2.7 | 1.96 | 0.056 |
| #2 | 0.43 | 0.43 | 0.12 | 0.375 | 0.15 | 0.17 | 0.42 | 0.13 | 0.03 |
| #3 | 0.14 | 0.23 | 0.10 | 0.134 | 0.14 | 0.03 | 0.14 | 0.08 | 0.01 |
| #4 | 0.15 | 0.11 | ------ | 0.45 | 0.05 | ------ | 0.08 | ------ | 0.01 |

As compared with the batch neutralized with 5% NaOH at 100° C., the other batches after neutralization treatment had higher color, poorer heat stability, and a definite disagreeable odor. We believe the improvement obtained with our "caustic boil" treatment is caused by complete neutralization of any free acid and saponification of all remaining small amounts of monoester.

It is very important that the ester be thoroughly washed with water following the caustic boil, in order to remove all the salts. If this is not done, the acid number of the ester may be high after distillation. We have found that three water washes are generally satisfactory for thorough washing of the ester to remove the salts, but any number of washes so that a reasonably clear wash water is obtained upon separation from the neutralized ester may be used.

By way of illustrating the method of carrying out our caustic boil process of neutralizing esters, we give the following example.

3998 grams of crude glyceryl tri-2-ethyl butyrate of acid number 1.68 mg. KOH/g. ester (prepared by heating 290 g. of 95% glycerine and 1044 g. of 2-ethyl butyric acid at 162–216° C. for 8¾ hours under an automatic decanting reflux condenser and distilling the product under 0.05 mm. pressure while bubbling a stream of air through the batch), was rapidly heated to 110° C. in a steam-jacketed turbo-mixer with 3 liters of 5% sodium hydroxide. This is roughly equivalent to 31 times the theoretical amount of caustic needed to neutralize the acid present. The temperature was kept at 110° C. for one hour, during which most of the water evaporated. Three liters of water was added, and the mixture was reheated until bubbling occurred; then the agitator was stopped and cold water was run through the jacket to stop the bubbling and aid in separation. Separation was rapid. The batch was then washed with water three times. 3304 g. of product was obtained. This was distilled at a pressure of 0.05 mm. of Hg. The fractions obtained were as follows:

| Fractions | Grams | Temp., °C. | Acid No. in Mg. KOH/Gm. Ester |
|---|---|---|---|
| Ice Trap | 20 | 103–119 | .056 |
| #1 | 44 | 119–129 | .0392 |
| #2 | 174 | 129–139 | .0336 |
| #3 | 540 | 139–147 | .028 |
| #4 | 984 | 147–149 | .0168 |
| #5 | 1,422 | 149–150 | .01 |
| #6 | 66 | | .01 |
| Residue | 46 | | |

The boiling point of the product under atmospheric pressure was 336–338° C. Its melting point was below 0° C. It had a refractive index of 1.4390 at 25° C., and a specific gravity of 0.976 at 25° C. It was insoluble in water at 28.5° C.

Di-2-ethyl-hexyl diglycollate, which after washing with 5% NaOH solution at room temperature retained 0.09% acid, retained only 0.0004% acid when treated by our "caustic boil" method. Heat stability of the ester was measured by heating it in a Nessler tube at 205° C. for four hours and observing the color change.

The results were as follows:

| Cold Caustic Wash | | | | 5% Caustic Boil | | | |
|---|---|---|---|---|---|---|---|
| P. P. M. Color | Heat Test Color | | | P. P. M. Color | Heat Test Color | | |
| | 1 Hr. | 2 Hrs. | 4 Hrs. | | 1 Hr. | 2 Hrs. | 4 Hrs. |
| 50 | 150 | 400 | 500 Brown | 25 | 40 | 65 | 150 |

What we claim as our invention and desire to be secured by Letters Patent of the United States is:

1. A process of freeing organic esters of molecular weight at least 330, and resistant to hydrolysis, from acidic substances, which comprises heating the ester for approximately one hour at a temperature of 100–110° C. with a 5% solution of sodium hydroxide, washing at least three times with water, and distilling the ester in vacuo.

2. A process of freeing organic esters of molecular weight at least 330, and resistant to hydrolysis, from acidic substances, which comprises heating the ester for approximately one hour at a temperature of 100–110° C. with a 5% solution of sodium hydroxide and washing a plurality of times with water until a reasonably clear wash water is obtained upon separation from said washed ester.

3. A process of freeing organic esters of molecular weight at least 330, and resistant to hydrolysis, from acidic substances, which comprises heating the ester for approximately one hour at a temperature of 100–110° C. with a 5% solution of sodium hydroxide, washing the ester thoroughly with water, and distilling it in vacuo.

4. A process of freeing organic esters of molecular weight at least 330, and resistant to hydrolysis, from acidic substances, which comprises heating the ester for approximately one hour at a temperature 100–110° C. with a 5% solution of sodium hydroxide, and then thoroughly washing it with water.

WILLIAM M. GEARHART.
LESTER W. A. MEYER.

REFERENCES CITED

The following references are of record in the file of this patent:

UNITED STATES PATENTS

| Number | Name | Date |
|---|---|---|
| 2,165,450 | Burke | July 11, 1939 |